(12) United States Patent
Moore et al.

(10) Patent No.: US 9,000,324 B2
(45) Date of Patent: Apr. 7, 2015

(54) FABRICATION OF LOAD COMPRESSOR SCROLL HOUSING

(75) Inventors: Jeffrey L. Moore, Lakeside, CA (US); Mark A. Fishburn, San Diego, CA (US); Jessica Skaar, San Diego, CA (US); Nagendra Narasimha Kedlaya, San Diego, CA (US); Donna Jane Reid, Escondido, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 767 days.

(21) Appl. No.: 13/189,691

(22) Filed: Jul. 25, 2011

(65) Prior Publication Data
US 2013/0028721 A1    Jan. 31, 2013

(51) Int. Cl.
| | |
|---|---|
| *B23K 15/04* | (2006.01) |
| *B23K 26/24* | (2014.01) |
| *F04D 29/42* | (2006.01) |
| *F01D 9/02* | (2006.01) |
| *F04D 29/62* | (2006.01) |

(52) U.S. Cl.
CPC ............ *F04D 29/4206* (2013.01); *B23K 15/04* (2013.01); *B23K 26/24* (2013.01); *F01D 9/026* (2013.01); *F05D 2230/232* (2013.01); *F04D 29/624* (2013.01)

(58) Field of Classification Search
CPC ...... B23K 15/00–15/10; B23K 26/20–26/322; B23K 2201/001; F01D 1/02; F01D 29/42; F04C 18/02–18/0292
USPC ................ 29/888.02, 888.022; 415/203–205; 219/121.13, 121.14, 121.63, 121.64
See application file for complete search history.

(56) References Cited

U.S. PATENT DOCUMENTS

| | | | |
|---|---|---|---|
| 3,913,887 A * | 10/1975 | Siepmann | ..................... 251/367 |
| 4,231,703 A | 11/1980 | Weiler | |
| 4,378,194 A | 3/1983 | Bankukwalla | |
| 4,627,234 A | 12/1986 | Schuh | |
| 5,133,638 A | 7/1992 | Mosure | |
| 5,156,534 A | 10/1992 | Burgy et al. | |
| 5,235,803 A | 8/1993 | Rodgers | |
| 5,309,029 A | 5/1994 | Gregory et al. | |
| 5,597,287 A | 1/1997 | Helmick | |
| 6,193,469 B1 | 2/2001 | Tsuda et al. | |
| 7,093,447 B2 | 8/2006 | Thompson et al. | |
| 7,097,411 B2 | 8/2006 | Smoke et al. | |
| 2006/0080832 A1 | 4/2006 | Yip et al. | |
| 2012/0051899 A1* | 3/2012 | Petitjean et al. | .............. 415/205 |

FOREIGN PATENT DOCUMENTS

JP          2009174395 A  *  8/2009
WO          01/94755 A1       12/2001

* cited by examiner

*Primary Examiner* — Samuel M Heinrich
(74) *Attorney, Agent, or Firm* — Carlson, Gaskey & Olds, P.C.

(57) ABSTRACT

A method of fabricating a load compressor scroll housing includes the steps of forging near net shape parts that are machined and subsequently welded together. The forged portions are machined to define specific features of the scroll housing along with the mating surfaces. An interface between top and bottom portions is defined within the volute chamber. The weld joint at the interface provides a finished surface within the volute chamber such that airflow is not adversely affected and additional machine process are not required within the volute chamber after formation of the weld joint.

13 Claims, 8 Drawing Sheets

FABRICATION OF LOAD COMPRESSOR SCROLL HOUSING

BACKGROUND

This disclosure generally relates to assembly of a load compressor for an auxiliary power unit. More particularly, this disclosure relates to fabrication of a load compressor scroll housing for an auxiliary power unit.

Aircraft utilize auxiliary power units for inflight restarting of main engines and to supply compressed air and electric power during ground operations. An auxiliary power unit typically includes a small gas turbine engine that drives a load compressor. The load compressor generates compressed air that can be used for environmental systems and to aid in starting a main engine. A load compressor includes an impeller driven by the small gas turbine engine that generates compressed air guided through a discharge scroll. The scroll is a volute passage defined by the load compressor housing that directs compressed air through a single outlet.

The volute passage is typically formed through known lost wax casting processes. Lost wax casting can be inefficient for some materials and therefore limits the materials utilized for forming the scroll housing.

SUMMARY

A disclosed method of fabricating a load compressor scroll housing includes the steps of forging near net shape parts that are machined and then welded together. The forged portions are machined to define specific features of the scroll housing along with the mating surfaces.

The load compressor scroll housing includes a volute chamber and annular passages that receive airflow from an impeller rotating within a central cavity of the scroll housing. The interface between top and bottom portions is defined within the volute chamber. The weld joint at the interface provides a finished surface within the volute chamber such that airflow is not adversely affected and additional machining is not required within the volute chamber after formation of the weld joint. The top and bottom portions are formed in a near net shape forging process starting with an aluminum billet. The forging operation from a billet provides a homogenous material composition of the scroll housing not reliably obtainable using other processes. An energy beam is directed through an annular passage into the volute chamber and against an outer wall to form the desired weld joint. The finished weld joint provides a desired finish within the volute chamber that does not adversely alter flow properties.

These and other features disclosed herein can be best understood from the following specification and drawings, the following of which is a brief description.

DETAILED DESCRIPTION

Figure 1:
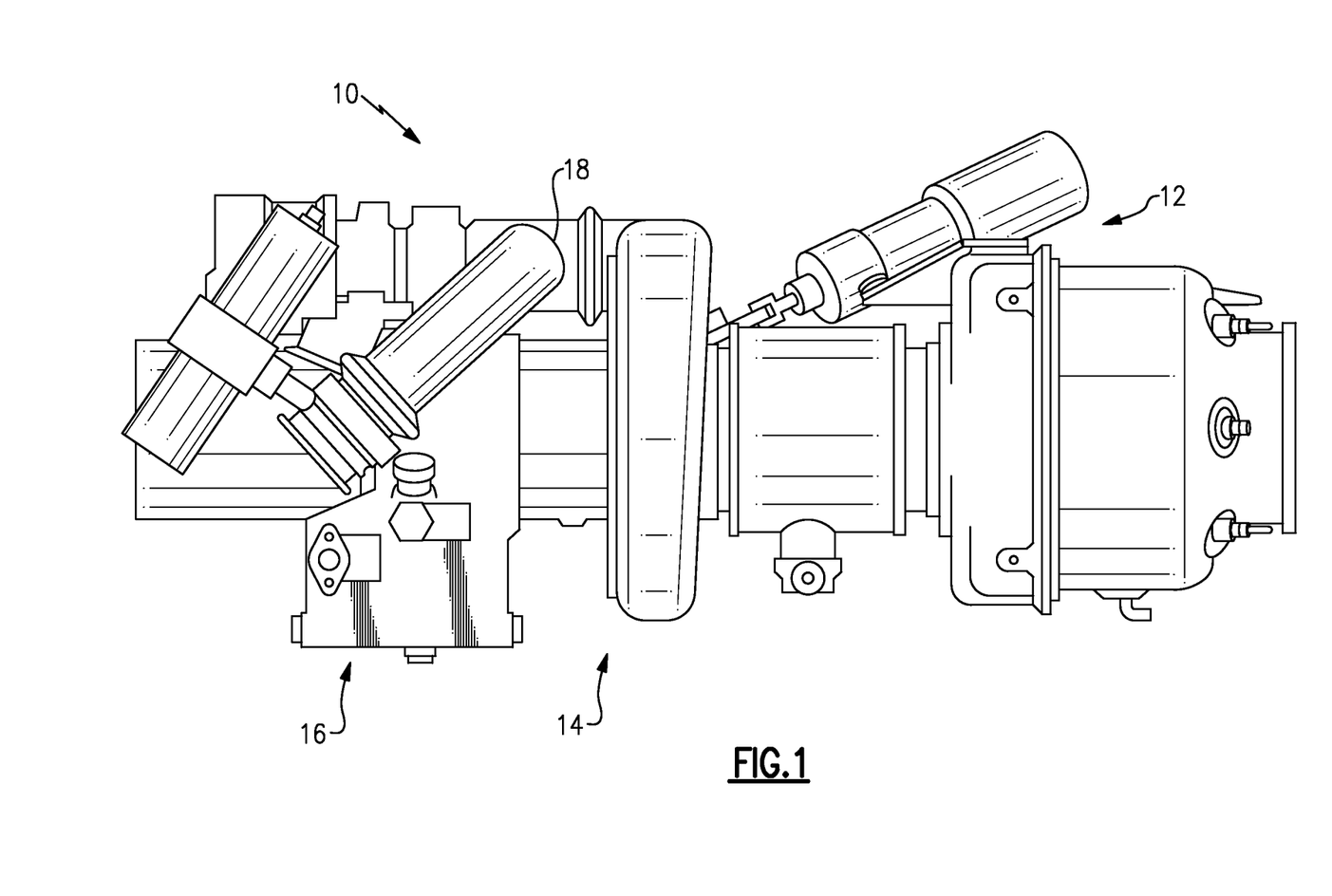
FIG. 1 is a schematic view of an example auxiliary power unit.
Figure 2:
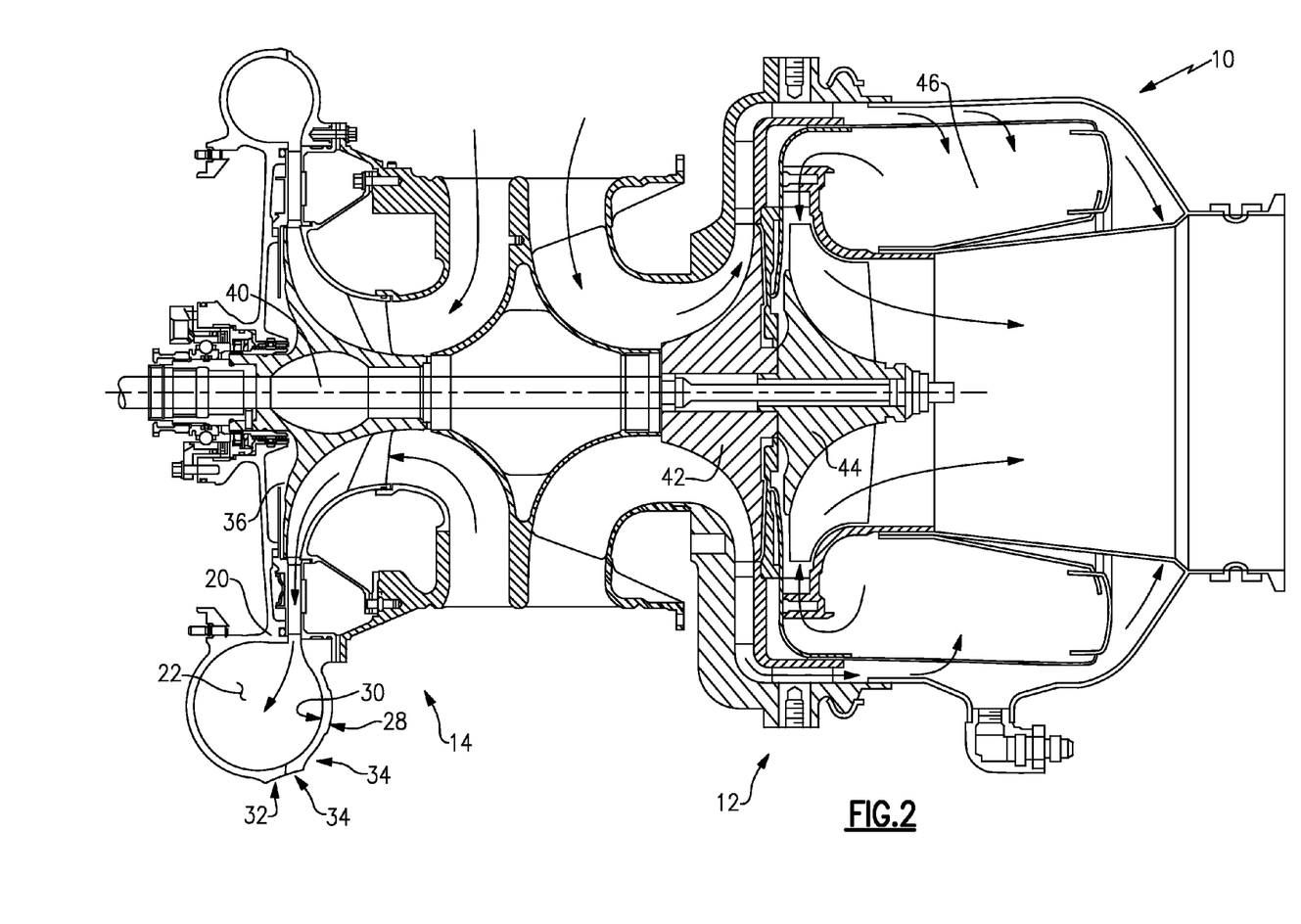
FIG. 2 is a cross-sectional view of a portion of an example auxiliary power unit.

Referring to FIGS. 1 and 2, an example auxiliary power unit 10 includes a gas turbine engine 12 that drives a load compressor 14 and an accessory drive unit 16. The load compressor 14 generates compressed air that is driven through ducts 18. The gas turbine 12 includes an inlet that draws air into a compressor 42. The compressor 42 is an impeller that is mounted onto a shaft 40 that is driven by turbine 44. Air drawn in by the compressor 42 is driven to combustor 46 where gasses are mixed with the compressed air and ignited. The ignited gasses produce a gas stream that is driven against the turbine 44 to drive the compressor 42. Also mounted on the shaft 40 is an impeller 38 for the load compressor 14. Accordingly, the load compressor 14 is driven by the turbine 44 on the common shaft 40.

Figure 3:
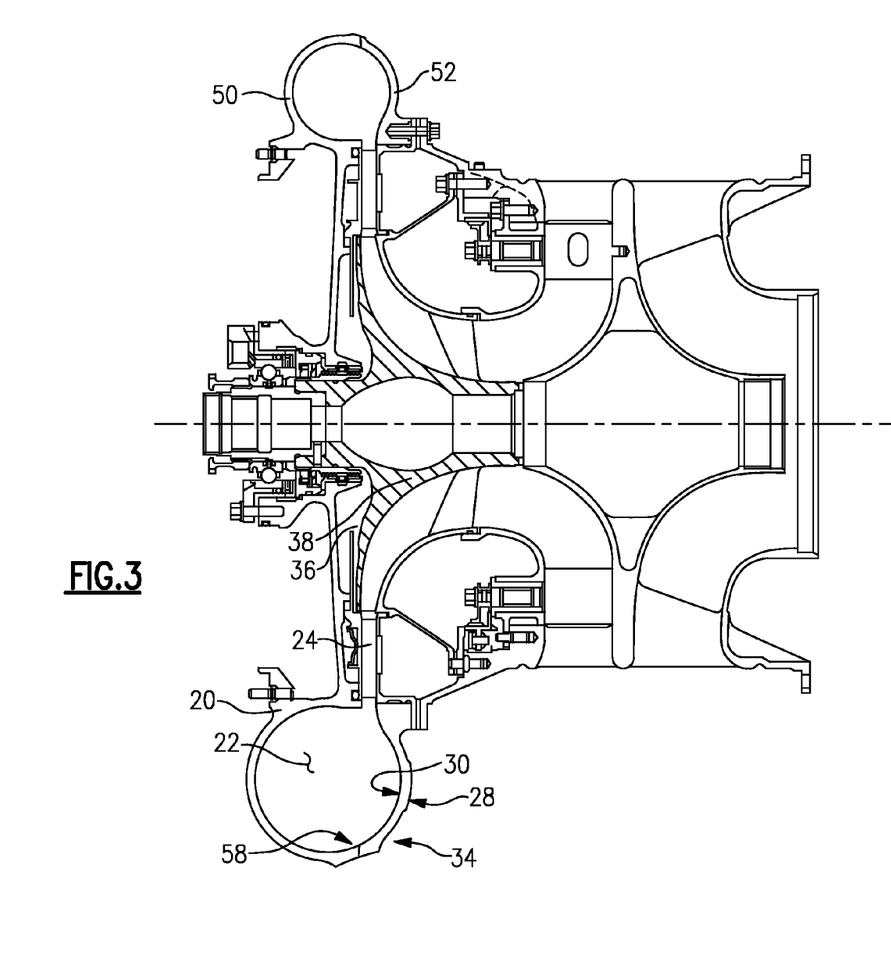
FIG. 3 is a cross section of a load compressor for an auxiliary power unit.

Referring to FIG. 3, with continued reference to FIG. 2, the load compressor 14 includes a scroll housing 20 that defines a volute chamber 22. Passage 24 provides for airflow from the impeller 38 into the volute chamber 22. From the volute chamber 22 the compressed air is driven through the ducts 18 to various units and accessories that utilize the compressed air. As appreciated, compressed air is utilized for aircraft environmental control systems and also to aid in the starting of a main aircraft engine. Moreover, the terms scroll or volute are also used by those skilled in the art to describe the example scroll housing 20 and other structures that gather flow from a diffuser discharge annulus and deliver that flow to a downstream pipe.

The example scroll housing 20 is fabricated from a top portion 50 and a bottom portion 52. The top and bottom portions 50, 52 of the scroll housing 20 define both the volute chamber 22 and the annular passages 24.

Scroll housing 20 is fabricated by welding the top portion 50 to the bottom portion 52. It is desired to provide a smooth surface finish within the volute chamber 22 such that airflow is not adversely affected by any inconsistencies within the surface finish. Accordingly, an interface 58 between mating surfaces defined on the top and bottom portions of the scroll housing 20 provides little interruption of the desired interior surface finish of the volute chamber 22.

An outer wall 28 of the volute chamber 22 includes the inner surface 30 and an outer surface 32. The inner surface and the outer surface 32 are defined by the outer wall 28. A boss 34 is disposed at the location of mating surfaces between the top and bottom portions 50, 52 of the scroll housing 20. The boss 34 provides additional material for the welded joint interface 58.

Figure 4:
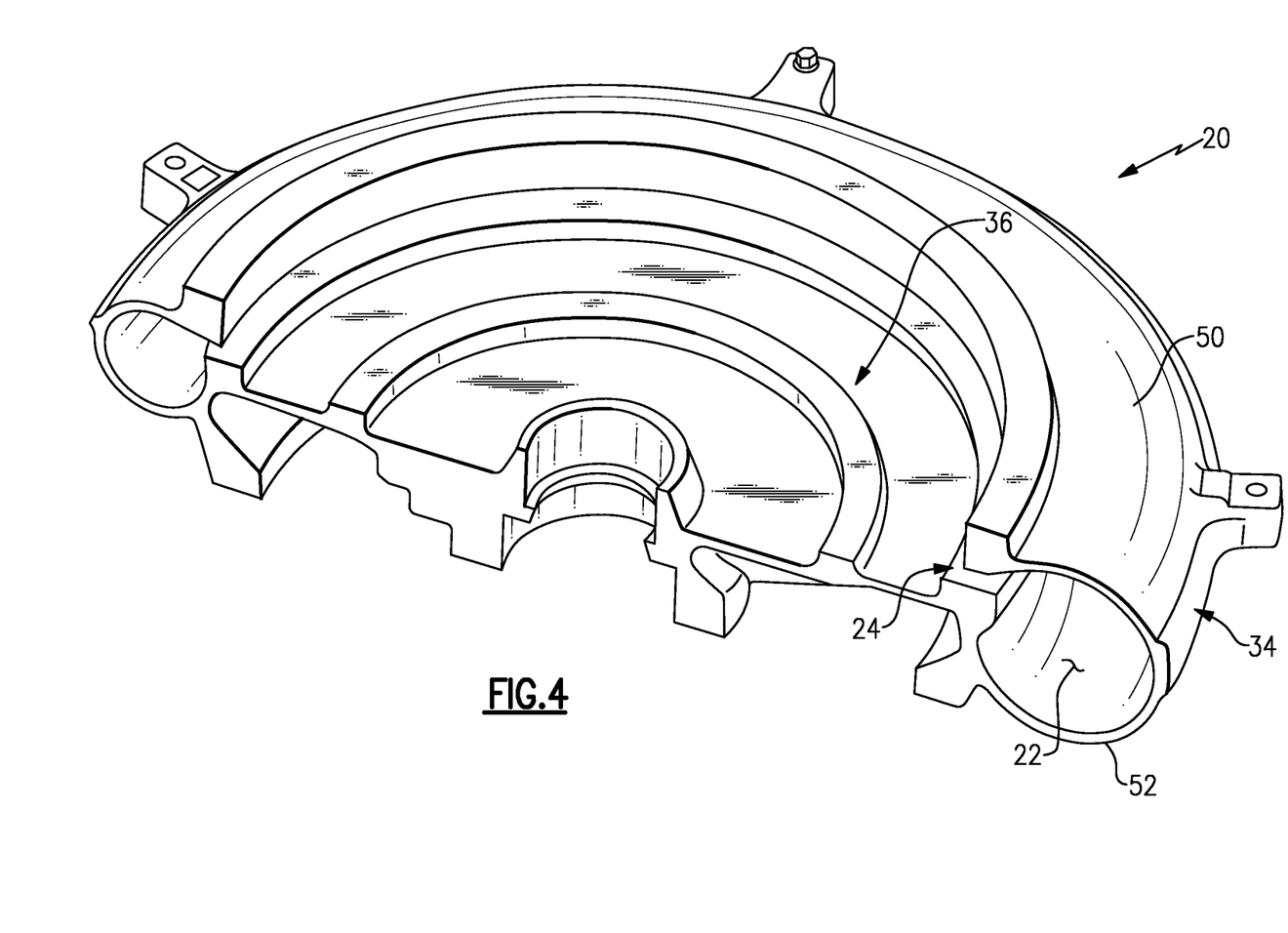
FIG. 4 is a sectional view of an example scroll housing for a load compressor.

Referring to FIG. 4, with continued reference to FIG. 3, the scroll housing 20 includes inner annular passage 24 open to an inner periphery of the inner cavity 36 that defines the space within which the impeller 38 rotates.

Figure 5:
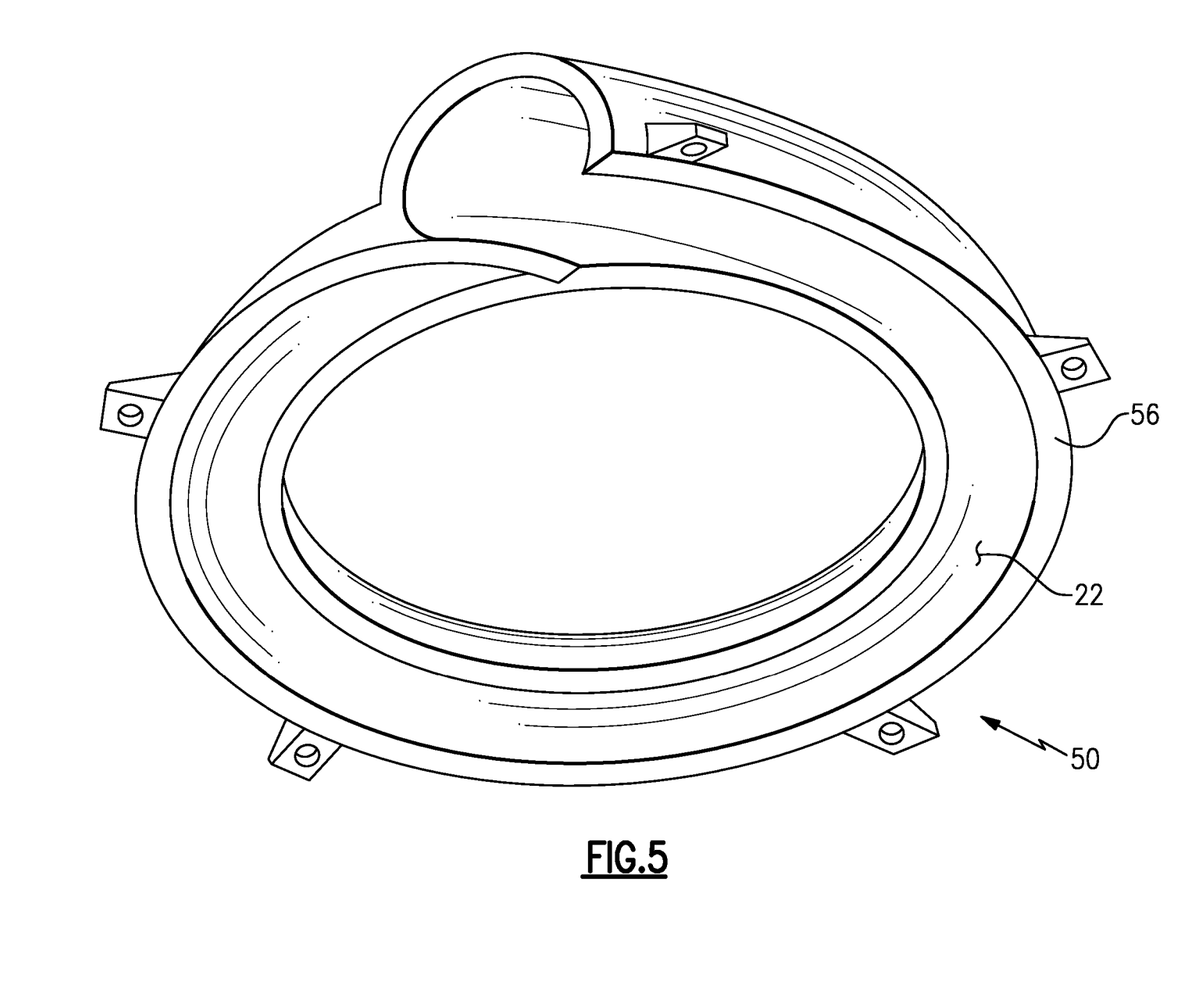
FIG. 5 is a perspective view of a top portion of the scroll housing.
Figure 6:
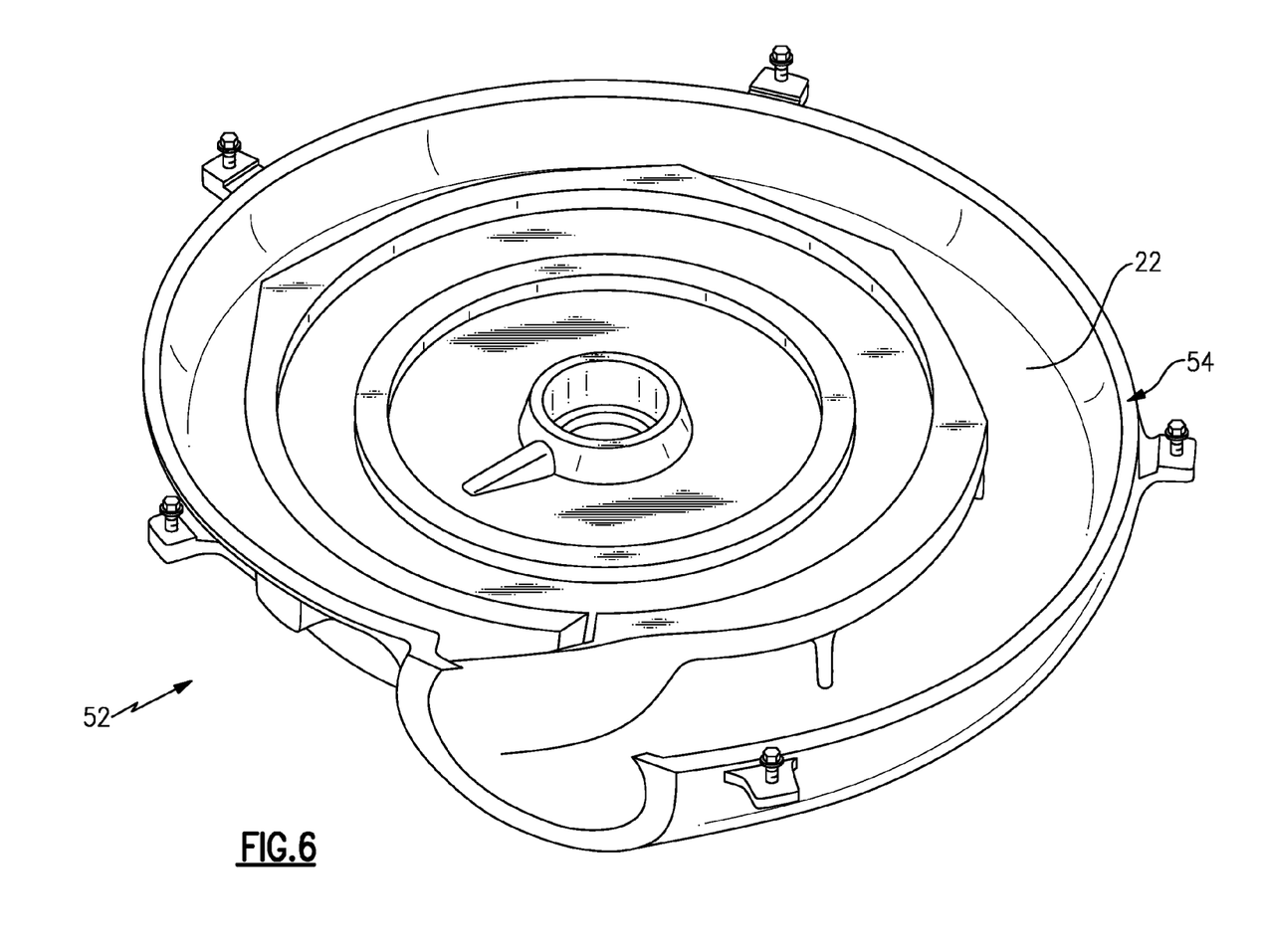
FIG. 6 is a schematic view of a bottom portion of the scroll housing.

Referring to FIGS. 5 and 6, the top portion 50 and the bottom portion 52 of the scroll housing 20 are formed from a forging operation. An aluminum alloy material is utilized to fabricate the example top and bottom portions 50, 52 of the example scroll housing 20. Some aluminum alloys are not compatible with lost mold casting procedures. In such non-compatible alloys, differences in the melting temperature of the alloy components cannot provide for homogenous distribution of elements in a lost wax molding process and therefore result in undesirable manufacturing inefficiencies.

The example scroll housing 20 is fabricated utilizing an extruded aluminum material. The aluminum material is extruded as a billet and shaped to a near complete configuration by a forging operation. After the forging operation is complete, various features are machined into each of the top and bottom portions 50, 52. Mating surfaces 54 and 56 are formed after forging to define the weld joint and mating interface 58 between the top and bottom portions 50, 52 of the scroll housing 20. Other surfaces are also machined to provide the desired configuration of the completed scroll housing 20 and include openings for a shaft bearing and also the inner cavity 36 within which the impeller 38 rotates. Once the desired machining operations are complete and provide the machine surfaces within desired tolerances the top and bottom portions are held together with the mating surfaces 54 and 56 in a desired alignment.

Figure 7:
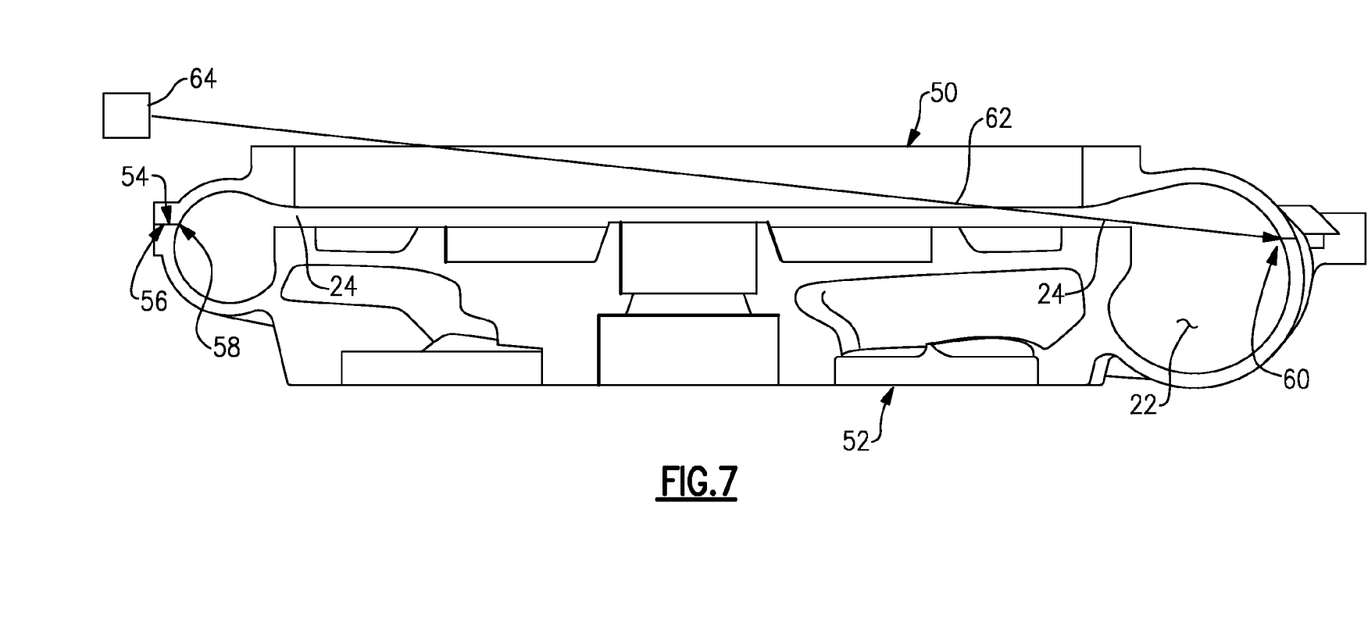
FIG. 7 is a cross-sectional view illustrating welding of the top and bottom halves of the example scroll housing.

Referring to FIG. 7, the now aligned top and bottom portions 50, 52 of the scroll housing 20 are welded utilizing an energy beam welding method. In this example, an electron beam 62 is utilized for forming the desired weld joint between the top and bottom portions 50, 52. In this example, an electron beam welding machine 64 generates an electron beam 62 that is directed through the passage 24 against the outer wall 28. The electron beam 62 is guided or directed through the passage 24 against an inner surface 30 of the outer wall 28. The specific location that the electron beam 62 is directed is the interface 58 between the mating surfaces 54 and 56.

The directed energy beam provides a weld joint 60 that creates a substantially finished surface that does not affect the desired airflow properties through the volute chamber 22. The weld beam 62 is applied in a continuous manner about the circumference of the volute chamber 22. This is accomplished by either rotating the electron beam 62 such that it is directed through the passage 24 or by rotating the assembled top and bottom portions of the scroll housing 20.

The electron beam 62 provides a weld joint 60 through the entire thickness of the outer wall 28 to form the desired joint. On an outer surface of the outer wall 28, a boss 34 is provided to further accommodate the weld joint 60. Once the desired weld joint is completed, the scroll compressor is finish machined to complete fabrication of the scroll housing 20. As appreciated, although an electron beam welding process is disclosed other beam welding processes could also be utilized such as for example laser welding.

Figure 8:
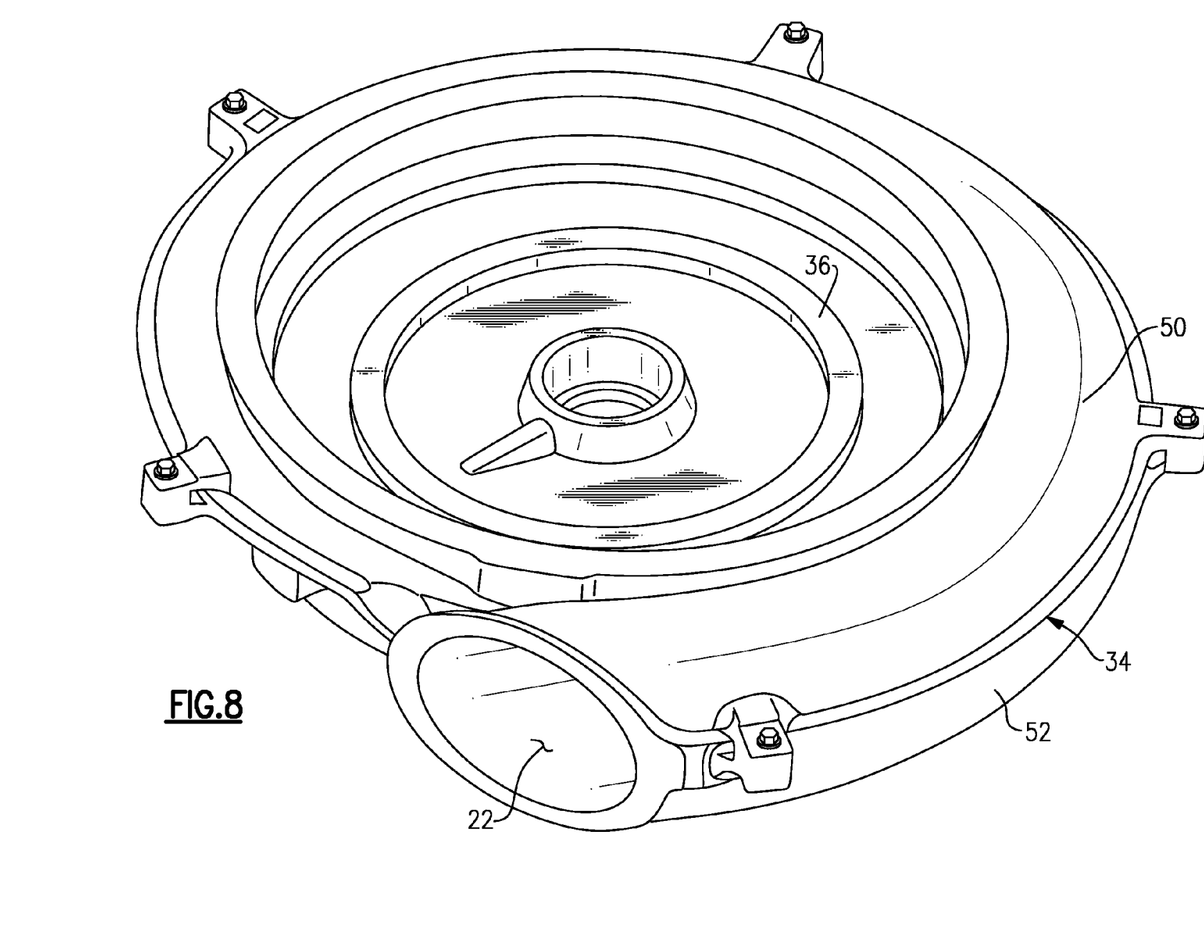
FIG. 8 is a perspective view of a completed example scroll compressor housing.

Referring to FIG. 8, completed scroll housing 20 as illustrated and includes all the features of a one piece housing without the inefficiencies caused by the lost wax molding manufacturing processes.

Accordingly, the example scroll housing for a load compressor provides a desired surface finish within the volute chambers without sacrificing manufacturing inefficiencies. Moreover, the electron beam welding method allows for the precision application of a weld joint within the volute chamber without modification of the part configuration.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A method of fabricating a scroll housing for a load compressor comprising:

forming a top portion including a first part of a volute chamber;

forming a bottom portion including a second part of the volute chamber, the volute chamber including an outer wall and an annular passage open to an inner periphery of an inner cavity;

forming a first mating surface on the top portion and a second mating surface on the bottom portion;

holding the top portion to the bottom portion with the first and second mating surfaces aligned;

directing an energy beam through the annular passage to engage an interface between the first and second mating surfaces within the volute chamber; and forming a weld at the interface with the directed energy beam.

2. The method as recited in claim 1, wherein the volute chamber comprises an outer wall with the interface between top and bottom portions being at the outer wall.

3. The method as recited in claim 2, wherein the outer wall comprises a inner surface that is part of the volute chamber and an outer surface that forms an outer surface of the scroll housing.

4. The method as recited in claim 3, wherein the directed energy beam comprises an electron beam forming the weld on the inner surface of the outer wall within the volute chamber.

5. The method as recited in claim 3, including forming a boss on the outer surface of the outer wall corresponding with the interface between the first and second mating surfaces.

6. The method as recited in claim 4, including forming a finished surface within the volute chamber at the interface of the first and second mating surfaces with the electron beam.

7. The method as recited in claim 1, including forging the top portion and forging the bottom portion.

8. The method as recited in claim 1, including forming finished surfaces using machine processes on the scroll housing after formation of the weld at the interface with the directed energy beam.

9. A method of assembling a load compressor for an auxiliary power unit comprising:

forming a scroll housing for the load compressor by forming a top portion including a first part of a volute chamber and a first mating surface, forming a bottom portion including a second part of the volute chamber and a second mating surface, the volute chamber including an outer wall and an annular passage open to an inner periphery, and forming a weld at an interface between the first and second mating surfaces by directing an energy beam through the annular passage to engage the interface within the volute chamber; and supporting an impeller within a central cavity formed in the scroll housing supported for rotation on a shaft.

10. The method as recited in claim 9, wherein the volute chamber comprises an outer wall with the interface between top and bottom portions being at the outer wall.

11. The method as recited in claim 9, wherein the directed energy beam comprises an electron beam forming the weld on the inner surface of the outer wall within the volute chamber.

12. The method as recited in claim 9, including forming a finished surface within the volute chamber at the interface of the first and second mating surfaces with an electron beam.

13. The method as recited in claim 9, including forging the top portion and forging the bottom portion.

* * * * *